(12) United States Patent
Tserng

(10) Patent No.: US 6,570,608 B1
(45) Date of Patent: May 27, 2003

(54) SYSTEM AND METHOD FOR DETECTING INTERACTIONS OF PEOPLE AND VEHICLES

(75) Inventor: Christopher Tserng, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/379,715

(22) Filed: Aug. 24, 1999

Related U.S. Application Data

(60) Provisional application No. 60/102,534, filed on Sep. 30, 1998.

(51) Int. Cl.[7] .............................. H04N 7/18; H04N 5/14; H04N 5/225; G06K 9/00
(52) U.S. Cl. ..................... 348/143; 348/169; 348/700; 382/103
(58) Field of Search ................... 348/142, 143, 348/144, 148, 149, 154, 155, 161, 169, 170, 171, 172, 586, 700, 699; 382/100, 192, 203, 283; 340/541; H04N 7/18

(56) References Cited

U.S. PATENT DOCUMENTS

| | | | | |
|---|---|---|---|---|
| 5,097,328 A | * | 3/1992 | Boyette | ........................ 348/150 |
| 5,937,077 A | * | 8/1999 | Chan et al. | ................... 382/100 |
| 5,956,424 A | * | 9/1999 | Wooton et al. | ............. 348/154 |
| 6,061,088 A | * | 5/2000 | Khosravi et al. | ........... 348/169 |
| 6,198,833 B1 | * | 3/2001 | Rangan et al. | .............. 382/103 |
| 6,366,316 B1 | * | 4/2002 | Parulski et al. | ............. 348/586 |

\* cited by examiner

*Primary Examiner*—Gims S. Philippe
(74) *Attorney, Agent, or Firm*—Robert D. Marshall, Jr.; W. James Brady, III; Frederick J. Telecky, Jr.

(57) ABSTRACT

A video surveillance system that implements object detection and event recognition employing smart monitoring algorithms to analyze a video stream and recognize the interaction of people with cars. The system forms a reference image consisting of the background of the scene viewed by the video camera. The system forms a foreground difference image between the current image and an updated reference image including any stationary cars. The system detects any objects other than any stationary car in the scene. The updated reference image is formed by forming a background difference image between the current image and the reference image. Any detected object is examined to determine if it is a car object. Upon initial detection of a stationary car object, the system forms a reference car image of a portion of the current image corresponding to the position of the stationary car. The system then forms the updated reference image by substituting this reference car image for a corresponding portion of the reference image. A number of special techniques preserve object integrity when objects overlap cars. The video surveillance system notes events when objects interact with cars such as an ENTER CAR event and an EXIT CAR event.

15 Claims, 11 Drawing Sheets

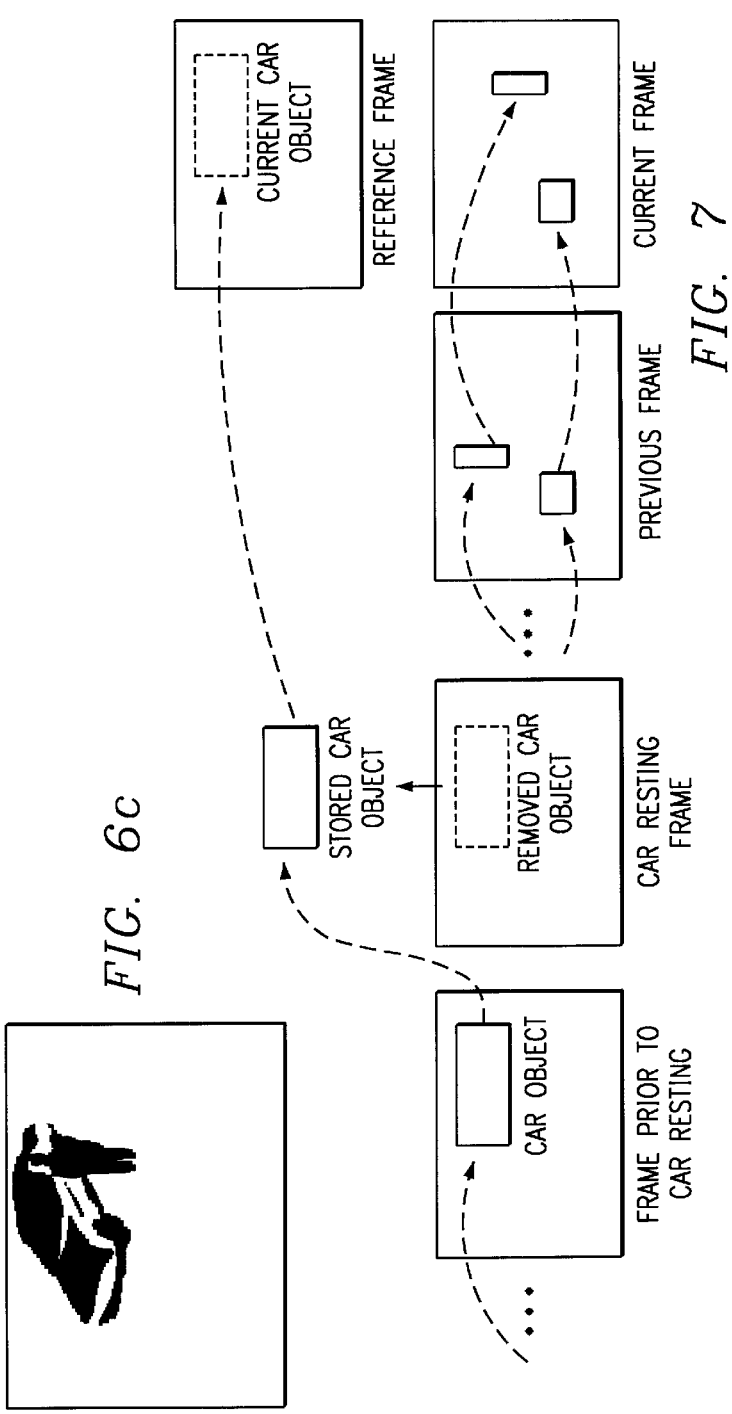
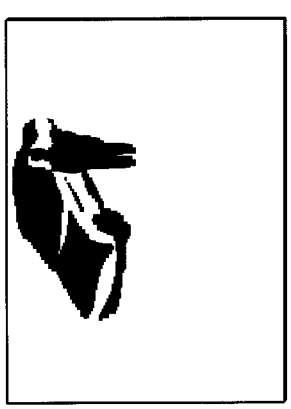
FIG. 6c
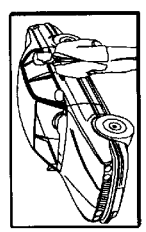
FIG. 6a
FIG. 6b
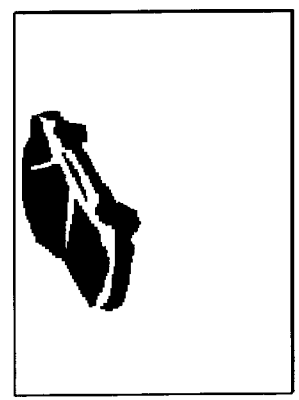
FIG. 8d
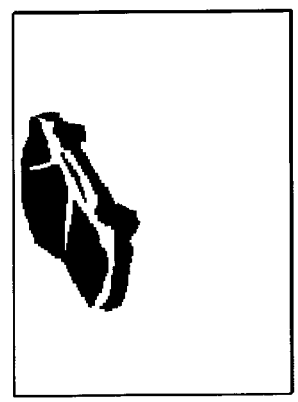
FIG. 8c
FIG. 8a
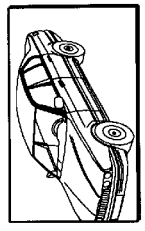
FIG. 8b

 
FIG. 22a    FIG. 22b
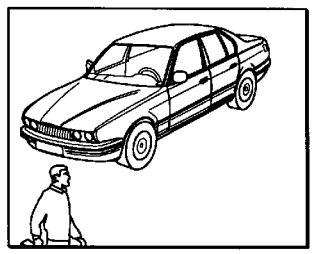 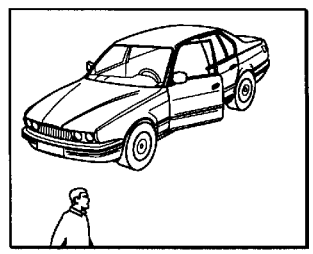 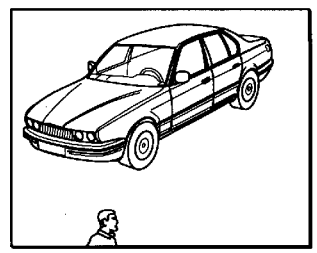
FIG. 22c    FIG. 22d    FIG. 22e
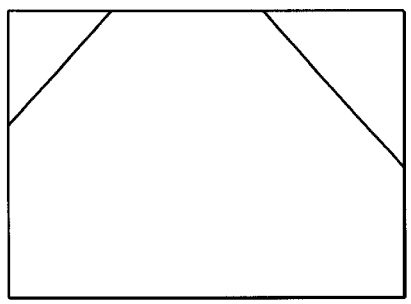 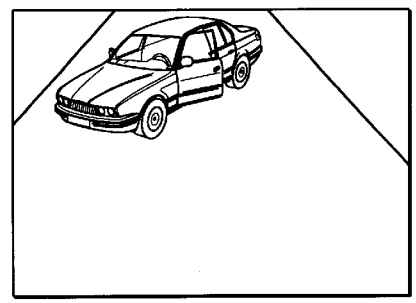
FIG. 23a    FIG. 23b
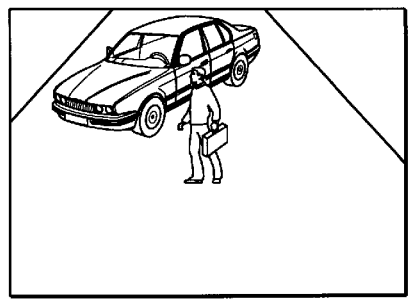 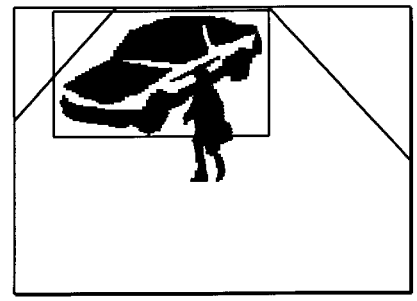
FIG. 23c    FIG. 23d

SYSTEM AND METHOD FOR DETECTING INTERACTIONS OF PEOPLE AND VEHICLES

This application claims priority under 35 USC §119(e)(1) of Provisional Application No. 60/102,534, filed Sep. 30, 1998.

TECHNICAL FIELD OF THE INVENTION

The technical field of this invention is automatic monitoring systems particularly automatic security systems employing computer image processing for detecting interactions between people and cars.

BACKGROUND OF THE INVENTION

As video cameras have become increasingly cheaper to produce and purchase, their functionality is beginning to evolve beyond their original intent to merely capture sequences of images. Smart video cameras of the future will be able to provide intelligent data about what objects moved and what events occurred within their field of view. The new functionality of smart cameras provides many new applications.

One increasingly valuable application for smart cameras is surveillance. Typical prior art surveillance cameras record hundreds of hours of moving images onto video tape which must be monitored by people in order to tell if something suspicious occurred. Most of the video data is useless because nothing interesting is occurring. However, with smart cameras, people can be alerted to specific events which the smart cameras detect. As smart cameras are developed, software algorithms will need to be developed to implement the smart monitoring functions.

SUMMARY OF THE INVENTION

This invention employs a video surveillance system that implements object detection and event recognition. This system implements several smart monitoring algorithms to analyze a video stream and extract intelligent data in real time. This invention describes data processing that enables the recognition of the interaction of people with cars. These new capabilities would allow smart security cameras of the future to monitor outdoor parking lots and driveways and intelligently report when suspicious events occur. For example, a smart camera could signal an alarm if a person exits a car, deposits an object near the building, re-enters the car, and drives away. Such interactions between people and cars are currently not recognized by the existing systems.

The video surveillance system operates as follows. The system forms a reference image consisting of the background of the scene viewed by the video camera. The system forms an updated reference image including any stationary cars. The system forms a foreground difference image between the current image and the updated reference image and detects any objects other than any stationary car in the scene. The updated reference image is formed by forming a background difference image between the current image and the reference image. Then the system detects objects in this difference image. Any detected object is examined to determine if it is a car object. This preferably employs an minimum size and aspect ratio test. Upon initial detection of a stationary car object, the system forms a reference car image of a portion of the current image corresponding to the position of the stationary car. The system then forms the updated reference image by substituting this reference car image for a corresponding portion of the reference image.

A number of special techniques preserve object integrity when objects overlap cars. The system tracks the position of each object through the series of video images. If an object overlaps a car for the first image when the car is stationary, then the updated reference image includes a fake background having black pixels at locations of the overlapping object. This prevents the updated reference image from erroneously including the overlapping object. If the car begins to move again, then all detected objects are checked for validity. The detected object is invalid and not tracked if more than 70% of its pixels are fake background. Car motion is detected by comparing the location of the car centroid between successive images.

Upon determining that a previously stationary car has begun motion, the system removes objects overlapping the now moving car and substitutes a reference car image for a corresponding portion of the updated reference image. This restores the reference image. The system also determines if any detected object in the current image corresponds to an object overlapping the car in a prior image. These objects are checked for validity based upon the length of their image history track. If the image history track has a length indicating a valid object, then the system back tracks this history to find a good view of the object. Such a good view is selected based upon size and stability.

All newly detected objects are checked for validity. This validity check compares the newly detected object in the foreground difference image with corresponding pixels in a car difference image. The newly detected object is invalid and not tracked if the number of matching pixels is less than half of all its pixels.

The video surveillance system notes events when objects interact with cars. An ENTER CAR event is signaled whenever an object overlaps a stationary car in one image and the corresponding object is not present in a next following image. An EXIT CAR event is signaled whenever an object overlaps a stationary car in one image and the corresponding object is not present in the immediately prior image.

BRIEF DESCRIPTION OF THE DRAWINGS

These and other aspects of this invention are illustrated in the drawings, in which:

FIGS. 6A to 6C illustrate the car background image as illustrated in FIG. 4B, the current car image and the car difference image, including the car and the occluding portion of the person, respectively;

FIG. 7 illustrates the creation of the motion graph for the current example;

FIGS. 8A, 8B, 8C and 8D illustrate the reference car image, the moving car image of the current video image, the reference car image and the moving car difference image, respectively, of this example;

FIGS. 22A to 22E illustrates the process of correcting the reference car image;

FIGS. 23A to 23D show an instance where the system recognizes that the car is resting late and improperly includes the car door is in the process of being opened into the updated reference image.

DETAILED DESCRIPTION OF THE PREFERRED EMBODIMENTS

In order to discuss methodology, some common terms need to be defined for clarity:

An object is an abstract entity which represents a real-world object. An object has blobs associated with it which correspond to the real-world object.

An image is a picture consisting of an array of pixels.

A video image is one image out of an input image stream constituting an image sequence.

A reference image is an image of a scene that corresponding to the background. Objects are generally detected from the difference between the current video image and the reference image.

A background image is an image of the scene with only background objects in it. It is usually used as the reference image.

A difference image is a binary image which is the result of thresholding the absolute difference of two video images. Thresholding the difference ensures that the difference image represents areas where the two video images differ significantly. It is typical to form such a difference between the current video image and the reference image.

Blobs are groups of connected pixels in a difference image which represent the change regions between the two video images. Blobs usually correspond to objects in the foreground of a scene.

A frame is an abstract entity which consists of a collection of objects and represents a video image.

Objects in consecutive frames which correspond to each other are linked together to form a motion graph.

Figure 1:
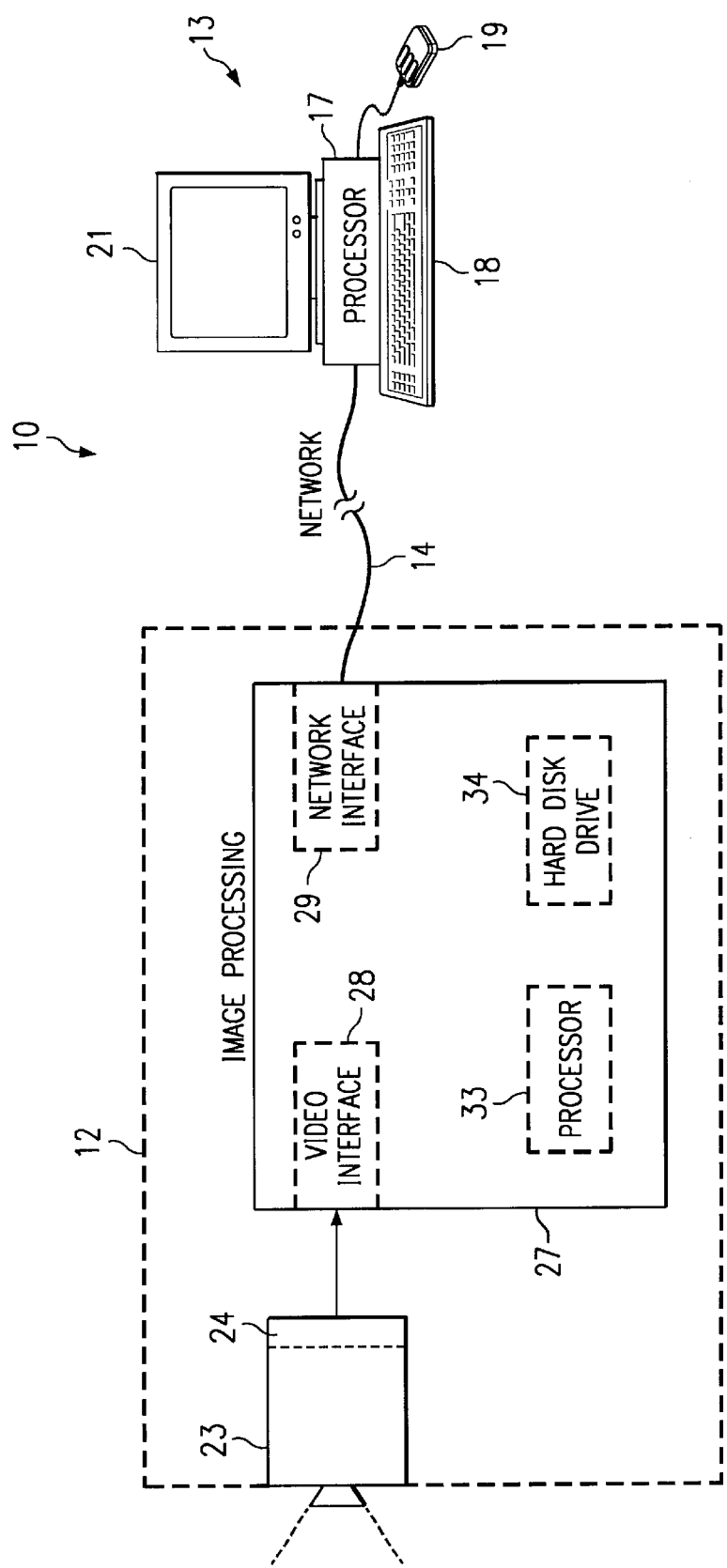
FIG. 1 is a diagrammatic view of a surveillance system 10 used monitor activity in a selected region or area.

FIG. 1 is a diagrammatic view of a surveillance or monitoring system 10 which embodies the present invention, and which is used monitor activity in a selected region or area. The monitoring system 10 includes a camera unit 12, a computer workstation 13, which are operatively coupled by a network shown at 14. The network 14 may be a local area network, the Internet, some other type of network, a modem link or a combination of these technologies. The computer workstation 13 may be a personal computer including a processor 17, a keyboard 18, a mouse 19 and a display unit 21.

The camera unit 12 includes video camera 23. Video camera 23 in the disclosed embodiment is a known monochrome camera that outputs gray-scale images. However, the present invention may be utilized with a color video camera or some other type of two-dimensional image detector, such as an infrared detector. Video camera 23 includes detector 24. Detector 24 may be a charge coupled device (CCD) or a CMOS image detector as known in the art. Video camera 23 not-illustrated includes optics of a known type, which focuses an image on detector 24.

Camera unit 12 further includes an image processing section 27. The image processing section 27 includes a video interface circuit 28 to receive the output of image detector 24. A network interface 29 facilitates communication across network 14. Image processing section 27 could also include a modem in addition to or in place of network interface 29. This would enable communications via a telephone line. Image processing section 27 further includes a processor 33. Processor 33 preferably consists of a digital signal processor and its corresponding volatile memory. Image processing section 27 includes a non-volatile memory such as hard disk drive 34 illustrated in FIG. 1. Hard disk drive 34 could optionally be replaced or supplemented by another suitable type of non-volatile memory such as FLASH memory, EPROM memory or DRAM memory with battery backup.

In the preferred embodiment, image processing section 27 is co-located in the same physical housing as camera 23 Thus camera unit 12 is a stand alone device which may be directly coupled to network 14. However, it will be recognized by those skilled in the art that image processing section 27 could alternatively be implemented within computer workstation 13 and physically separate from camera 23. In this alternative, computer workstation 13 preferably includes a plug-in video capture card serving a video interface and a plug-in network interface card for communication via network 14. Though the embodiment disclosed includes a single camera 23, it is possible to provide plural cameras with a single image processing section.

The basic system performs three data processing steps for every image of a video sequence to recognize events. The three steps are detecting objects, tracking objects, and analyzing the motion graph.

The first step used in recognizing events is finding interesting objects in the scene. This task is accomplished using a two dimensional change detection technique that is commonly used in image analysis. Basically, a background image is taken of the scene to be monitored. This background image ideally contains only background objects, which are stationary and deemed unimportant. This background image is used as the system's reference image. To detect objects in the scene for a give video image, the system first takes the absolute difference of the pixel values of the current video image and the reference image. This image is then thresholded to give a difference image of motion blobs. These motion blobs are regions where the current video image differs significantly from the background image. Then, heuristics are used to group these blobs into distinct objects. These objects are placed in a frame. The objects in their frame form an abstract representation of the video image. The goal of this step is to locate all the objects in a given video image.

Figure 2A:
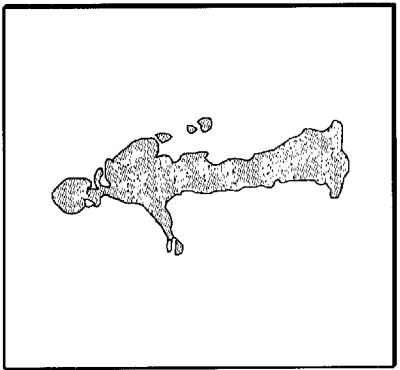
FIGS. 2A to 2H are views various stages of object detection in a video image.
Figure 2B:
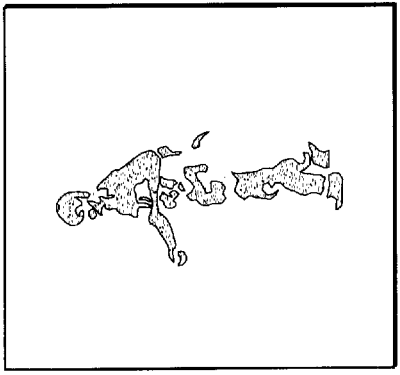

This initial processing of video images by the image processing section 27 will now be described with reference to FIGS. 2A to 2H. More specifically, FIG. 2A is a diagrammatic view of a video image produced by the video camera 12 when it is directed toward an area which, in this example, has arbitrarily been selected to be the corner of a room. The video image of FIG. 2A is saved as a reference image. FIG. 2B is a similar video image that was obtained from the camera 12 at a later point in time, after an object 41 has been introduced into the monitored area. In this case, the object 41 is a person, who has walked into the corner of the room and thus into the field of view of the video camera 12. The video camera 12 is stationary, and thus the single difference between the images of FIGS. 2A and 2B is the presence of the person 41 in FIG. 2B. The presence and movement of the person 41 is detected in the following manner.

Figure 2C:
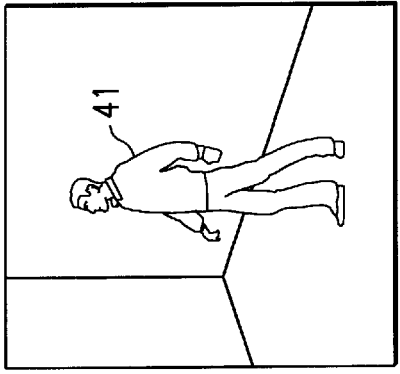
Figure 2D:
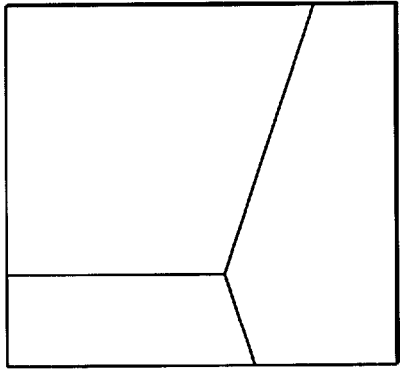

First, the gray-scale image of FIG. 2B is subtracted from the gray-scale image of FIG. 2A, on a pixel-by-pixel basis. The absolute value of the difference for each pixel is then determined, and the result is the gray-scale difference image of FIG. 2C. Then in this example, the difference image of FIG. 2C is sub-sampled in order to reduce the number of pixels, for example to a 128 by 128 or 256 by 256 pixel image. The resulting low-resolution image is shown in FIG. 2D. It will be recognized that it is alternatively possible to sub-sample each of the images of FIGS. 2A and 2B before determining the difference and absolute value for each pixel, which reduces the number of pixels that need to be processed, and therefore reduces the amount of time needed to obtain the image of FIG. 2D. Note that subsampling is not necessary if the system has sufficient computing capacity.

Figure 2E:
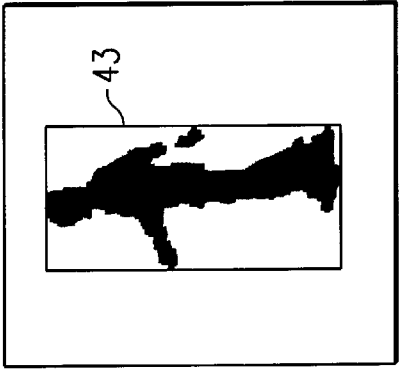

The low-resolution difference image of FIG. 2D is then thresholded. In other words, the gray-scale value for each pixel in the image of FIG. 2D is compared to a predetermined threshold, and the pixel is then set to be either on or off (black or white), depending on whether the value is above or below the threshold. The resulting threshold image is shown in FIG. 2E. Each pixel in the threshold image of FIG. 2E can be represented by a binary "1" or a binary "0", depending on whether the pixel is considered to be on or off.

Morphological processing is then carried out on each pixel of the threshold image of FIG. 2E, by first performing a dilate operation, and then performing an erode operation. More specifically, each pixel is processed by viewing it as the center pixel in a three-by-three matrix of pixels. During the dilate operation for each pixel in the threshold image of FIG. 2E, if any one of the eight neighboring pixels in that image is a logic "1", the pixel of interest is set to a logic "1".

Figure 2F:
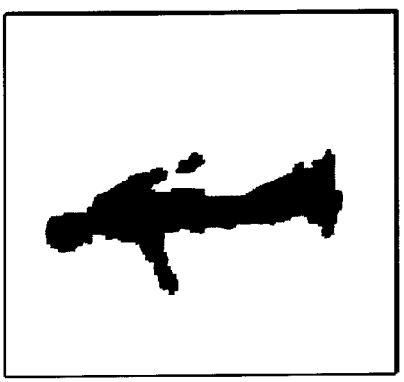

The resulting dilate image is shown in FIG. 2F. During the subsequent erode operation for each pixel in the dilate image of FIG. 2F, if any one of the eight neighboring pixels in that image is a logic "0", then the pixel of interest is set to a logic "0". The result is the erode image of FIG. 2G.

Figure 2G:
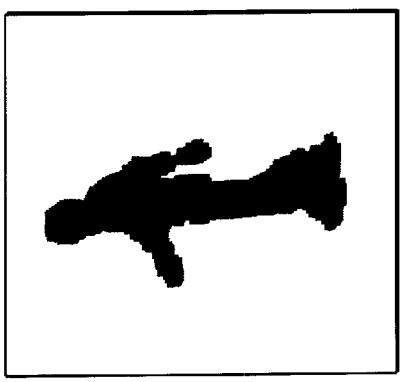
Figure 2H:
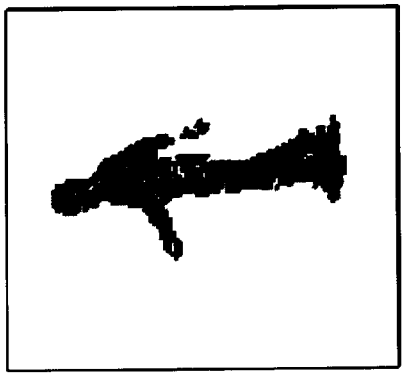

The erode image of FIG. 2G is then analyzed to identify each region of contiguous logic "1" pixels. Each such region of contiguous logic "0" pixels represents a change region, corresponding to an object which has been introduced into the image of FIG. 2B and which was not present in the image of FIG. 2A, such as the person 41. This analysis can be carried out using known techniques, such as run-length encoding followed by connected-component analysis.

With respect to each detected change region, the image processing section 27 determines a bounding box for the change region. An example of a bounding box is shown at 43 in FIG. 2H. It will be noted that the bounding box 43 is a rectangular box, just large enough to contain the entire change region. That is, no pixel of the change region lies outside the box, but every side of the box touches at least one pixel of the change region.

The above-described image processing is carried out for each image in a succession of images provided by the video camera 12. That is, each of these successive images is processed with respect to the reference image of FIG. 2A, in the same manner that was described above for the image of FIG. 2D.

It is optionally possible to also carry out an identification analysis, in an attempt to identify a detected object. For example, with a small amount of knowledge about the topography of the monitored area, the image processing section 27 can use the position in the image of the midpoint of the lower side of the object's bounding box in order to identify how far the object is from the camera. Then, knowing how tall a person that far from the camera would be, the image processing section 27 can evaluate the vertical height of the bounding box in the image, in order to determine whether the object generating the change region is tall enough to be a person. If the object is sufficiently tall to be a person, it can be assumed that it is a person.

Alternatively, the computer could map the endpoints of the lower side of a bounding box from the video image to a map of the monitored area. Given the scale of the map, the image processing section 27 could determine the distance between these two points on the map, which corresponds to the distance between them in the video image, and would thus be the length of the lower side of the bounding box in the image. The computer could then determine the height of the bounding box in the video image, and evaluate whether the object in question is tall enough to be a person. If the object is sufficiently tall to be a person, the image processing section 27 assumes that it is a person.

If the object is not sufficiently tall to be a person, then the image processing section 27 can carry out an object analysis procedure, by analyzing the image of the object in an attempt to classify it as one of several common objects, such as a briefcase, a notebook, a box, or a computer monitor. If the object is not specifically identified through this approach, then it is ultimately identified as an unknown object.

Once objects are detected in a video image, the next step is to track each object through the video sequence. This task is done by linking objects in the previous frame to their corresponding objects in the current frame. Correspondence is established by matching objects with their nearest neighbors. The path of links which follows a given object through successive frames is called an object's track. The objects and their tracks create a directed graph which represents the history of the motion of the objects in a video sequence. This directed graph is called a motion graph. The goal of this step is to create a motion graph for use by the next step in event recognition.

Finally, to recognize events, the system analyzes the motion graph. For example, if a track for an object appears for the first time, an ENTER event is recognized. Similarly, if an object's track splits into two tracks and one track becomes stationary, a DEPOSIT event is recognized. The system currently recognizes the following vocabulary of events: ENTER, EXIT, REST, MOVE, DEPOSIT, REMOVE, LIGHTS-ON and LIGHTS-OUT. These events are most common in an office environment where the main interaction is between people and smaller stationary objects. The types of objects one deals with outdoors varies a lot with those found indoors. In an indoor environment, a human is usually one of the only moving objects. Everything else is usually rigid and stationary such as briefcases, notebooks, chairs, computers, etc. However, outdoors, humans are not usually the largest thing and are not the only things moving. Cars move around just as often as humans do in an outside environment. Cars also complicate event recognition because people can get into and out of cars. This invention involves the interactions between people and cars.

The image processing section 27 analyzes the motion graph by tracking movement or non-movement of each identified change region through a succession of the frames or images from the video camera. For purposes of facilitating an understanding of the present invention, one known motion analysis technique will be briefly summarized with reference to FIG. 3. Although it will be recognized that motion analysis in the video images is carried out in two dimensions, for purposes of convenience the diagram of FIG. 3 shows just one dimension.

Figure 3:
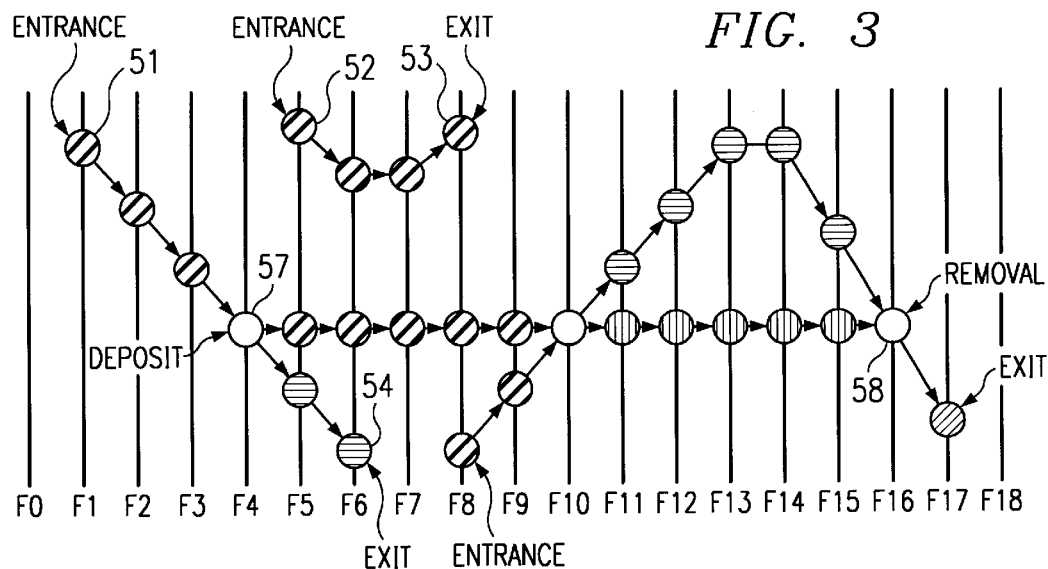
FIG. 3 illustrates an example of one known motion analysis technique.

In FIG. 3, the nineteen vertical lines F0 through F18 each represent a respective frame or image in a series of successive images from the video camera 12. In FIG. 3, the horizontal dimension represents time, and the vertical dimension represents one dimension of movement of an object within a two-dimensional image. When an object which was not previously present first appears, for example at 51 or 52, it is identified as an entrance or ENTER event. When an object which was previously present is found to no longer be present, for example at 53 or 54, it is designated an EXIT event. If an existing object splits into two objects, one of which is moving and the other of which is stationary, for example as at 57, it is designated a DEPOSIT event. This would occur, for example, when a person who is carrying a briefcase sets it down on a table, and then walks away.

If a moving object merges with a stationary object, and then continues to move while the stationary object disappears, as at 58, it is designated a REMOVE event. This would correspond to a situation where a person walks to a notebook resting on a table, and then picks up the notebook and walks away.

Three other types of events, which are not specifically illustrated in FIG. 3, are a REST event, a MOVE event, and a LIGHTS-OUT event. A REST event occurs when a moving object comes to a stop but continues to be present without moving. A practical example is a situation where the objects being monitored are vehicles in a parking lot, and a car pulls into a parking space and thereafter remains stationary. A MOVE event occurs when a detected object which has been stationary begins moving again, for example when a car that has been parked begins moving. A LIGHTS-OUT event occurs when the entire detected image suddenly changes, for example when the lights in a monitored room are turned out and the room becomes dark. A LIGHTS-ON or LIGHTS-OUT event can be detected without all of the image processing described above in association with FIGS. 2 and 3.

The following description of the inventive analysis of the interactions between people and cars employs some simplifying assumptions. A first set of assumptions involve parameters of the scene. These assumptions are:
1. Cloudy day ensuring no shadows, reflections or dramatic lighting changes.
2. Static environment with no moving trees, moving grass, etc.

The second set of assumptions involves the people and cars tracked. These additional assumptions are necessary to simplify the task of handling people and car interactions. These assumptions are:
1. Cars present only lateral views to the camera.
2. No cars in the scene overlap one another.
3. Overlapping people and cars cannot be moving simultaneously.

This third assumption exists because it is difficult to keep track of two moving objects which overlap one another. Various techniques exist or can be developed to handle the difficulties corresponding to each of these simplifying assumptions. However for the sake of clarity and ease of description, this application will focus on the primary data processing required to recognize and record events resulting from the interactions of people and cars.

First the system must be able to distinguish between people and cars. Given the assumption that cars would be laterally viewed, the system detects objects that are cars by using an object's size and its aspect ratio. If an object is greater than 3.5 feet high and greater than 11.0 feet wide, and has an aspect ratio (height/width) less than 0.7, then the object is labeled as a car. The size of an object in feet is obtainable because the system includes an image coordinate to world coordinate mapping. This mapping is based on quadrilaterals that map horizontal planes in an image to horizontal areas in a floor map. The bottom of an object is used to place that object in world coordinates. This determines the distance of the object from the camera. This determination is based upon the assumption that the monitored area is flat and level and that cars rest on the ground. Knowing this distance permits the system to determine an object's actual size from its apparent size in the video image. Once the system has an idea of which objects are cars, it can begin to analyze the motion graph to recognize new events. This technique is described in U.S. Provisional Patent Application Serial No. 60/083,711 filed Apr. 30, 1998 and entitled "METHODS AND APPARATUS FOR MAPPING A LOCATION FROM A VIDEO IMAGE TO A MAP," now U.S. patent application Ser. No. 09/292,499 filed Apr. 15, 1999, which is incorporated by reference.

In the prior art, if an object's track splits into two, and one object is stationary, then the system calls this event a DEPOSIT. In order to detect a person exiting a car, the DEPOSIT event recognition was modified to check if the stationary object was a car. Similarly, in the prior art if two objects merged into one and the merged object moves away, then the system calls this event a REMOVE. This REMOVE event recognition could be modified to determine if one of the objects was a car. Thus the system would report a person entering a car.

This approach does not perform very well. This technique Is poor performance was caused mainly because it made the false assumption that merging of people and car objects and separating correspond to people respectively entering and exiting cars. This assumption caused to system to frequently produce both false positives and false negatives. For example, if a person were to walk past the front of a car, this technique would detect a person entering a car and a person exiting a car because it saw a person blob merging and then splitting from a car blob. Furthermore, if a person exited a car, deposited an object, and re-entered the car, all within a close distance to the car, the system may never segment the person and a car. Thus, no events would be detected. Clearly, another method was needed to detect people entering and exiting cars.

The inventive approach to detecting people entering and exiting cars utilizes a new technique involving additional image differencing. The technique is based on a method of detecting objects even when they're overlapping the car. This method requires two reference images. One reference image consists of the original background scene or the background image. The second reference image is called the updated reference image and is identical to the first reference image except that it includes the stationary car. The system forms a subimage difference between the car background image and the corresponding part of the current video image. This detects any motion of the car and objects overlapping the car. However, the system also forms the difference between the current video image and the updated reference image containing the car. This allows the system to detect objects which may be overlapping the car. Using this technique it is easy to detect when people enter and exit a car. If an object disappears when its overlapped with a car, it probably entered the car. Similarly, if an object appears overlapped with a car, it probably exited the car. The remainder of this application will detail this new differencing technique.

When a car comes to rest, the following sequence of events occurs:
1. The car object is removed from its frame and stored.
2. The car image is merged with the background image creating an updated reference image containing the car. A reference car image is defined as the subregion of the updated reference image that contains the car.
3. The car background image, the region of the original background image that is replaced by the car image, is stored.

Figure 4A:
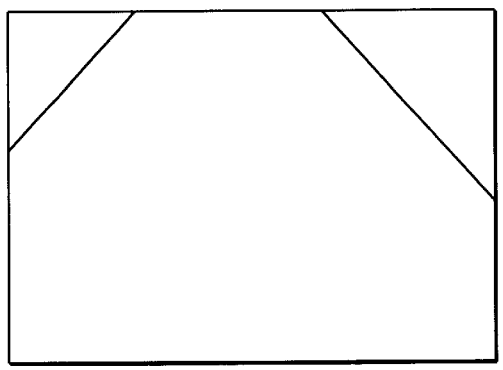
FIGS. 4A, 4B and 4C illustrates an example background image, the corresponding car background image and the corresponding updated reference image, respectively.
Figure 4C:
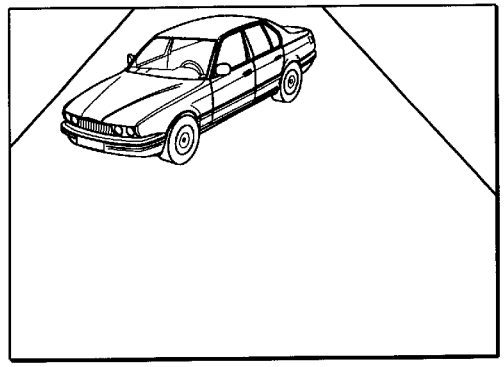
Figure 4B:

FIG. 4A illustrates an example background image. FIG. 4B illustrates the corresponding car background image of this example. FIG. 4C illustrates the corresponding updated reference image of this example.

For each successive frame, two difference images are generated. The first difference image, called the foreground difference image, is calculated from the current video image and the updated reference image. This foreground difference image contains all the blobs that represent objects other than the car, including objects that overlap the car.

Figure 5A:
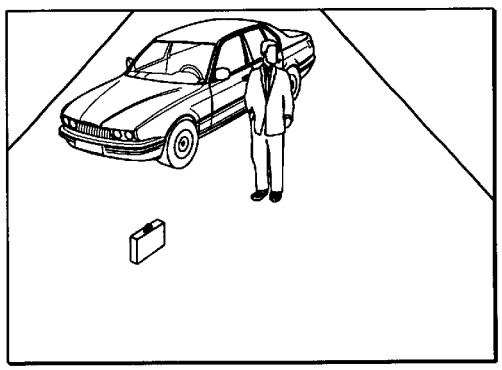
FIGS. 5A and 5B illustrate the current video image corresponding and the foreground difference image, respectively, corresponding to the example of FIGS. 4A to 4C.
Figure 5B:
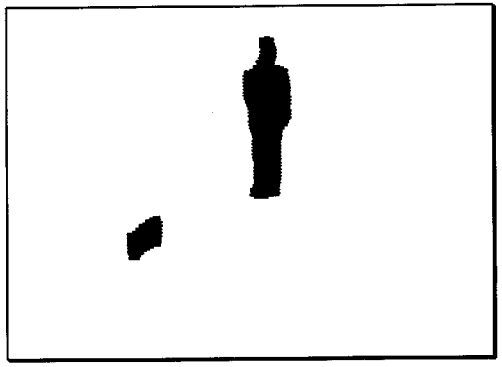

FIGS. 5A to 5B illustrate this for the example of FIGS. 4A to 4C. FIG. 5A illustrates the current video image corresponding to the example background of FIG. 4A. FIG. 5B illustrates the foreground difference image, which includes all objects other than the car.

The second difference image, called the car difference image, is calculated from the current car image, the region of the current video image which corresponds to the location of the car, and the car background image. The car difference image contains blobs that represent the resting car.

FIGS. 6A to 6C illustrate this for the example of FIGS. 4A to 4C. FIG. 6A illustrates the car background image. This is the same as illustrated in FIG. 4B. FIG. 6B illustrates the current car image. Note that this current car image includes an occluding portion of a person. FIG. 6C illustrates the car difference image, including the car and the occluding portion of the person.

The system next groups the blobs in the foreground difference image into objects using the normal grouping heuristics. These objects are placed in the current frame. The blobs in the car difference image are stored. Note that every blob in the car difference image necessarily represents the car because this includes only the subimages are the location of the car. Therefore these blobs are all grouped into one current car object and placed in a special reference frame. Normal links occur between objects in the previous frame and objects in the current frame. Additionally, the stored car object, which was removed from its frame, according to Step 1 noted above, is linked to the current car object which is in the reference frame. In any given sequence, there one reference frame is stored to save memory.

FIG. 7 illustrates the creation of the motion graph for the current example. The car resting frame represents the frame prior to the background image being updated. As indicated by the dotted lines, all objects maintain their tracks using this method. Notice that even though the car object disappears from future frames due to the updated reference image, an EXIT event is not detected because its track is maintained throughout every frame. Using this method, the system is able to keep track of the car object as well as any objects overlapping the car. If an object appears intersecting a car object, an EXIT CAR event is reported. This generally occurs when a person has gotten out of a car. If an object disappears while intersecting a car object, an ENTER CAR event is reported. This generally occurs when a person enters a car.

The system will continue to operate in this manner until the car in the reference frame begins to move again. The system determines a car begins moving based on the movement of its centroid. The system compares the position of the centroid of the stored car object with the centroid of the current car object. Note that the current car object is obtained from the car difference image.

This is illustrated in FIG. 8A to 8D. FIG. 8A illustrates the reference car image. FIG. 8B illustrates the moving car image of the current video image. FIG. 8C illustrates the reference car difference image. FIG. 8D illustrates the moving car difference image.

Car motion is determined based on motion of the centroid of the car object. If the centroids of the reference car image and the current car image differ by more than 6.5 pixels, the following sequence of events occur to restore the system to its original state:
1. An object representing the moving car is created in the current frame.
2. The stored car object is linked to this new moving car object in the current frame.
3. Objects in the previous frame that intersect the moving car are removed from that frame.
4. The car background image is merged with the updated reference image to restore the original reference image.
5. Normal differencing object detection continues.

Figure 9:
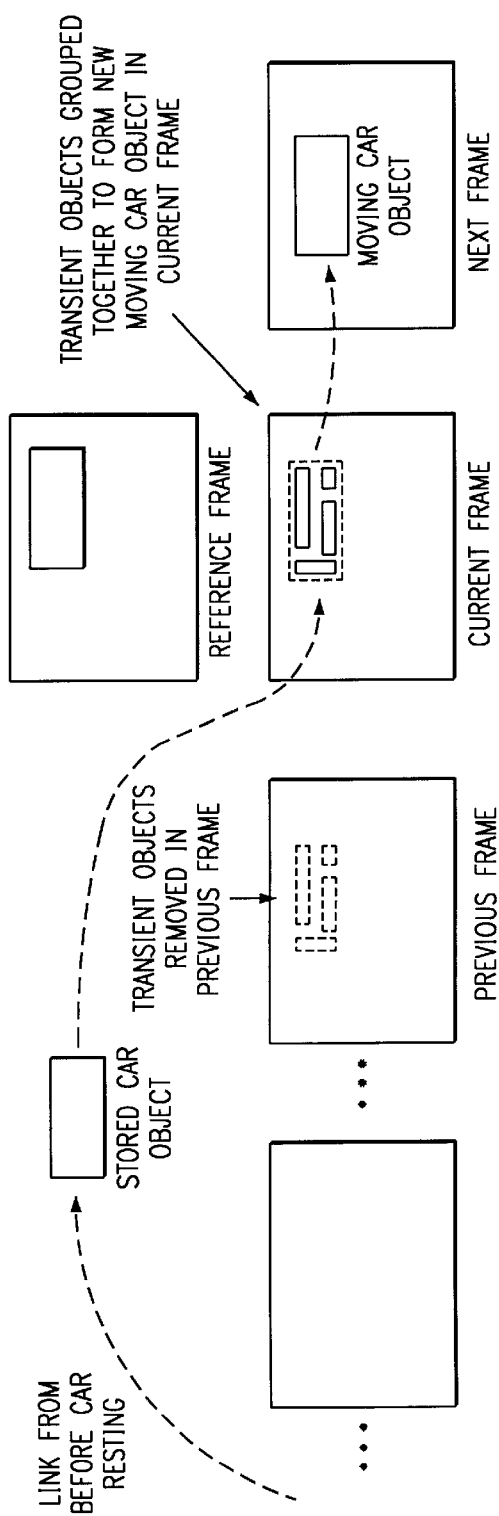
FIG. 9 illustrates the restoration of normal differencing object detection.

FIG. 9 illustrates the restoration of normal differencing object detection. The frame labeled current frame represents the last frame prior to the original reference image being restored. Note how there is one continuous track that represents the path of the car throughout all time.

Figure 10C:
FIGS. 10A to 10C illustrate the updated reference image, the current video image and the foreground difference image for an example when a car begins to move again causing transient blobs to appear in the foreground difference image due to the fact that the car is in the updated reference image.
Figure 10B:
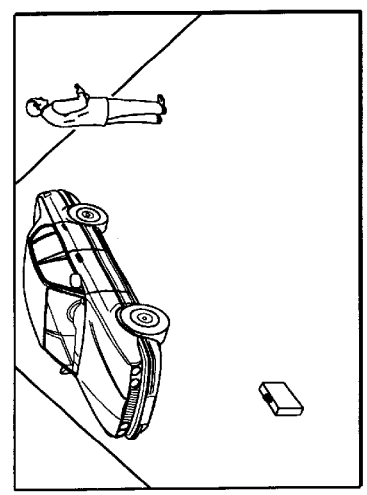
Figure 10A:
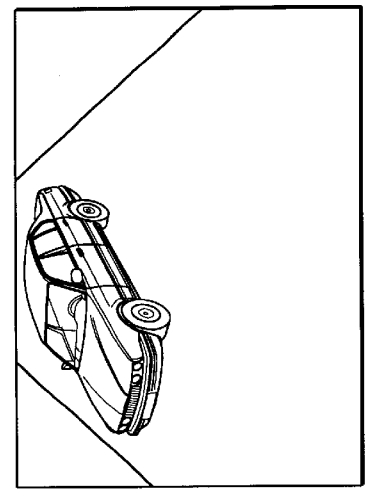

When the car begins to move again, transient blobs appear in the foreground difference image due to the fact that the car is in the updated reference image as seen in FIGS. 10A to 10C FIG. 10A illustrates the updated reference image. FIG. 10B illustrates the current video image. FIG. 10C illustrates the foreground difference image. Therefore, to create a new moving car object in the current frame, these transient objects, which are identified by their intersection with the location of the resting car, are grouped together as one car object. If there are no transient objects, a copy of the stored car object is inserted into the current frame. This way, there is definitively a car object in the current frame for the stored car object to link with. Transient objects might also appear in the previous frame when a car is moving. Therefore, these transient objects must be removed from their frame in order to prevent them from being linked to the new moving car object that was just created in the current frame. After the steps described above occur, the system continues in the normal manner until another car comes to rest.

The basic method described above creates a new issue. How does the system maintain the integrity of objects which occlude a car? This issue causes problems in situations where the object is occluding the car prior to the car resting and prior to the car moving again. This invention will deal with these situations individually. Again, this example implementation assumes that the car and the object cannot be moving at the same time.

An object occluding the car when the car comes to a rest causes a problem because the above procedure updates the object into the reference image and thus the object disappears. This invention includes a method to handle this problem. When the blobs of an object and a car blobs merge, the object along with its location is stored. Then, when the car comes to a rest, all the usual mechanisms occur to update the reference image. However the system further modifies the reference car image. The pixels corresponding to the last known location of the occluding object's blob are set to black. This black blob in the reference image is called a fake background. It is important that the object does not move once its blob merges with the car blob. Otherwise, the last known location of the object will be incorrect resulting in the fake background being in the wrong area of the car reference image. The result of this modification is to create an overlapping object in the next frame even though the object has been merged into the reference image along with the car. Therefore, the integrity of the object is maintained even when the car comes to a rest.

Figure 11A:
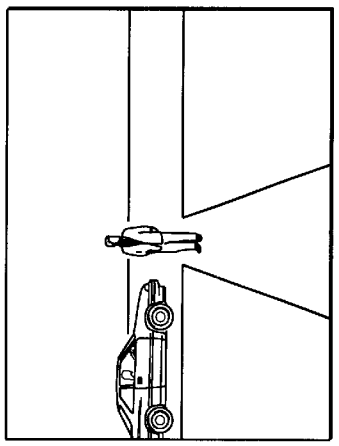
FIGS. 11A to 11D illustrate respective steps of an example of this process of providing a fake background.
Figure 11B:
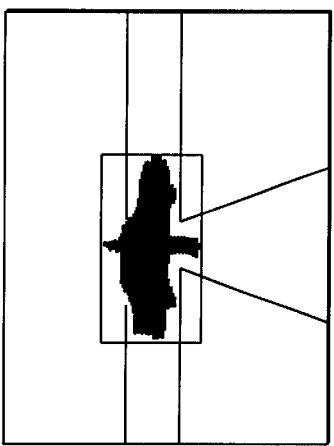
Figure 11C:
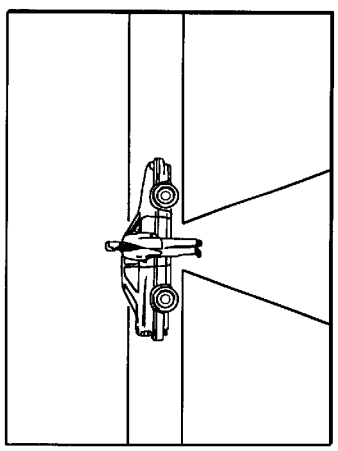
Figure 11D:
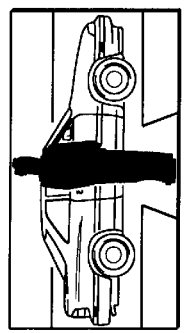

FIGS. 11A to 11D illustrate an example of this process of providing a fake background. In this example, a person waits to be picked up by the car. FIG. 11A illustrates the final output image prior to merging blobs. The person is standing still waiting to be picked up. This image is the last image showing the car and the person as separate objects. FIG. 11B illustrates the final output image after car comes to rest. The blobs of the car and the person are merged. FIG. 11C illustrates the updated reference image. Note that the person standing in front of the car is a part of this updated reference image. FIG. 11D illustrates the modified car reference image with the fake background. Note that the portion of the car reference image of the last known location of the person is the fake background. This is in front of the car and is set to black as described above.

Figure 12A:
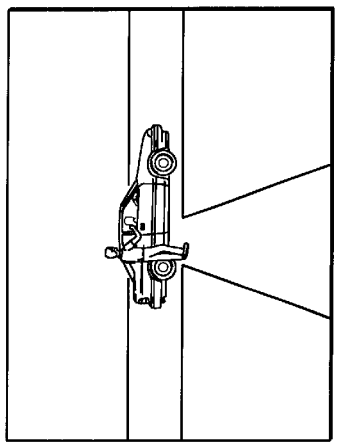
FIGS. 12A to 12C illustrate the current video image, the resulting foreground difference image and the final output image, respectively, of the example of FIG. 10.
Figure 12B:
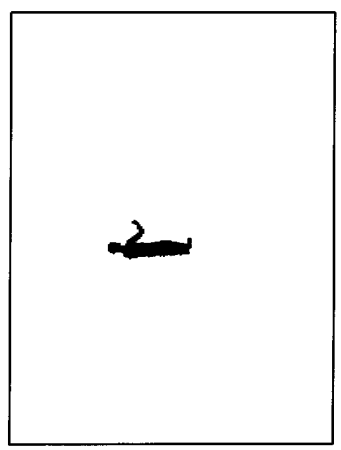
Figure 12C:
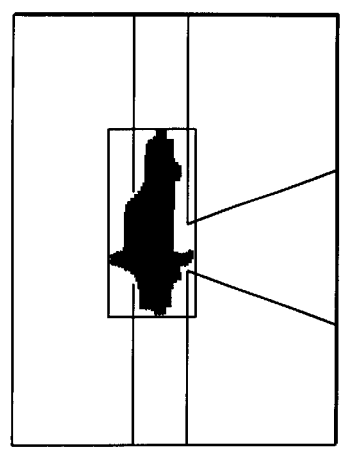

The results of this process is illustrated in FIGS. 12A to 12C. FIG. 12A illustrates the current video image of this example. FIG. 12B illustrates the resulting foreground difference image. Note that this foreground difference image in FIG. 12B includes a blob representing the person. This person blob results from the person in the current video image of FIG. 12A differing from the black pixels in the modified reference image of FIG. 11D. Thus the final output image of FIG. 12C includes two objects, one representing the car, and one representing the person. Thus object integrity is maintained.

A problem arises in that once an object begins moving again, the fake background will cause a false object to appear. False objects will also appear if the object moves to a different location. As described below, occluding objects which appear in these circumstances will be checked for validity. Another problem occurs if the object enters the car. If this occurs the once valid object becomes invalid. The above mentioned validity check will not be made, since it is not a new appearance. Therefore, objects which come to a rest or objects that still exist when the car begins to move, are checked to see if they are false due to fake background. This check is done by determining if over 70% of the pixels in the object's blob are black. If this is true, then this is determined as a false object due to movement relative to the fake background. If this is true, then the appropriate pixels of the reference car image representing the fake background are updated with the pixels of the current car image.

Figure 13B:
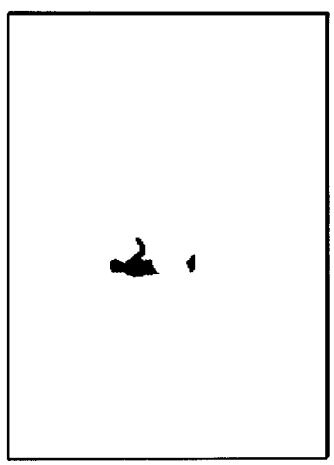
FIGS. 13A to 13E illustrate an example of restoration from the fake background technique including the current video image, the foreground difference image, the reference car image with the fake background, the current car image and the corrected reference car image, respectively.
Figure 13A:
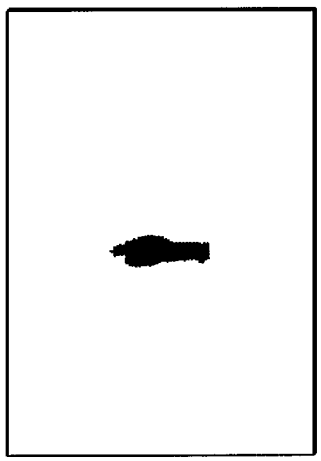
Figure 13D:
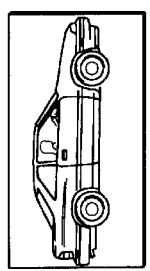
Figure 13C:
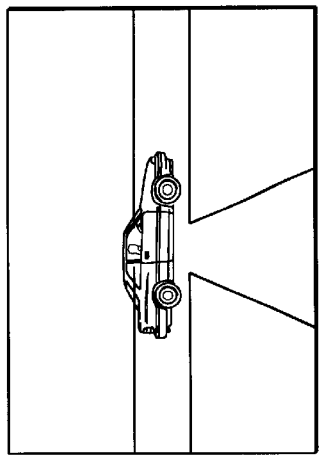
Figure 13E:
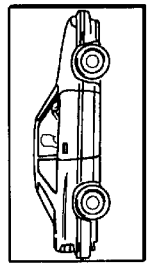

FIGS. 13A to 13E illustrate an example of this technique. In FIGS. 13A to 13E the person in the previous example finally enters the car. FIG. 13A illustrates the current video image. FIG. 13B illustrates the foreground difference image. This shows a person blob due to the fake background in the updated reference image not matching the person who has just entered the car. FIG. 13C illustrates the reference car image with the fake background. Because this blob in FIG. 13B includes more that 70% black pixels in the car reference image in FIG. 13C, this reference car image is corrected. FIG. 13D illustrates the current car image, which is used to correct the reference car image. FIG. 13E illustrates the corrected reference car image.

An object occluding a resting car when the car begins to move again causes problems. The object gets grouped with the car object and its track is lost. Therefore when the car moves away, the remaining object causes the system to report a false enter event. A new technique of this invention handles this situation. When a car begins to move again, the usual mechanisms occur to restore the original reference image. However, when the system is grouping objects in the current frame to create a new moving car object, it checks to see if any of the objects correspond to a real object. This check is done by seeing if the object has a track length greater than a threshold. Real objects will have long tracks. False objects, which just correspond to the motion of the car, will not have long tracks. If the object has a sufficiently long track, then the system moves backwards through the object's track to find an old state of the object's blob. The system checks if the blob is less than three feet wide and is not changing substantially in area. This step is done in order to find the actual blob which represents the occluding object. The blob representing the occluding object in the current frame is incorrect because of the motion of the car. The car motion creates transient objects that get grouped with the real occluding object creating an incorrect blob. Therefore, this backtracking step is necessary. Once the actual blob is found, it is stored. Once the car moves away from the object, they split into two blobs. The stationary blob is checked to see if it matches the stored blob. If it does, then this blob is linked back to that object. Because of this matching step, this technique works best if the object does not move while the car moves away. In this way, the occluding object's integrity is maintained even after the car has moved away.

Figure 14A:
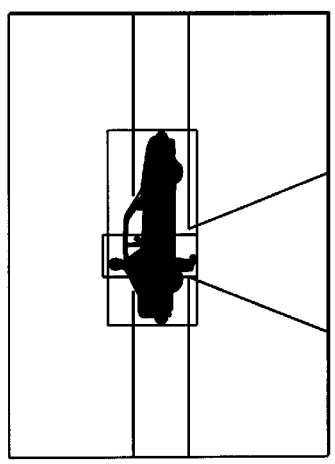
FIGS. 14A and 14B illustrate the foreground difference image and the corresponding final output image, respectively for an example in which a person has just exited a resting car.
Figure 14B:
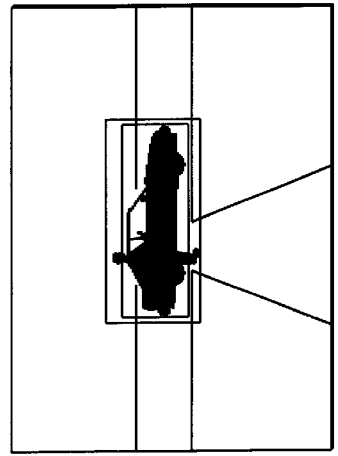

The next Figures illustrate an example of a person exiting a car, which then moves away. FIG. 14A illustrates the foreground difference image in which a person has just exited a resting car. As seen in the foreground difference image of FIG. 14A, the system recognizes the person as a real object. FIG. 14B illustrates the corresponding final output image.

Figure 15B:
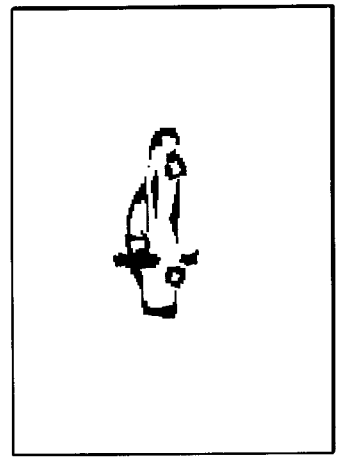
FIGS. 15A and 15B illustrate the foreground difference image and the final output image, respectively, when the car begins to move.
Figure 15A:
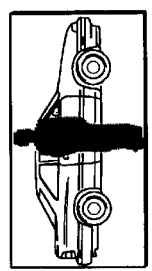

FIGS. 15A and 15B illustrate when the car begins to move. FIG. 15A illustrates the foreground difference image. In FIG. 15A, the car begins to move again causing transient blobs to appear in the foreground difference image. These blobs get grouped together to form one object, as shown in the final output image illustrated in FIG. 15B. At least part of the blob still corresponds to the person object shown in FIG. 14B.

Figure 16:
FIG. 16 illustrates the process of backtracking to find a valid object.

FIG. 16 illustrates the process of backtracking to find a valid object. The system determines that the blob corresponds to an object having a sufficiently long track. The system the backtracks through the blob's track until it finds a blob that most likely corresponds to the actual object. This is the final blob illustrated in FIG. 16. This blob is stored for later use.

Figure 17:
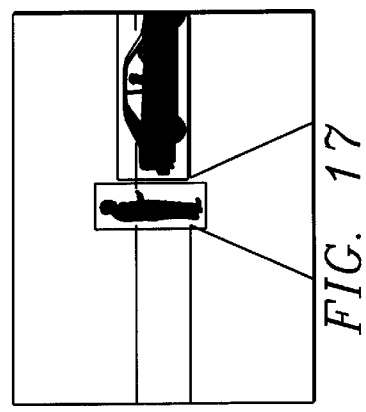
FIG. 17 illustrates the final output image following the special case processing when a car starts moving.

Finally, when the car moves away and the person blob is separated from the car blob. The system compares the new person blob with the blob which was stored earlier. The new blob is similar in appearance and at the same location as the stored blob. Then the new blob is linked to this object and object integrity is maintained. FIG. 17 illustrates the final output image following this processing.

Given the basic method, the system is subject to frequent errors. These errors mainly result from the fact that a bad car image is updated into the reference image. A bad car image may contain objects other than the car. The result of a bad car image being updated into the reference image is that false objects appear. This may cause false events to be reported. This invention employs methods which correct bad car images which have been updated into the reference image.

The system can correct bad car images by eliminating false objects. It is possible to check every object in every frame to see if its a valid object. However, this would be computationally expensive. This invention check an object for validity only when it first appears. This method operates on the assumption that an object which is valid when it appears will always be valid. The following methods provide different heuristics to determine if an object is valid, and if it is not how to remove the object and correct the cause of it.

One source of false objects is noise resulting from small motions in the car. For example, if the system updates the reference image with the car image when the car is not quite at rest, the resting car will be slightly displaced from the car in the updated reference image. This will cause false objects to appear. However, almost all these situations have one thing in common. The false blobs in the foreground difference image created by the displacement resemble the edges of the car. Therefore, whenever a new object appears, a binary edge image is created for the car in the reference image. This binary edge image is created using the Sobel edge detection technique. Next, the pixels in the object's blob are compared to the pixels in the edge image. If more than 70% of the blob's pixels match the pixels in the edge image, then the system thinks the object is noise and discards it. Then, the updated reference image is corrected. This correction replaces the pixels in the reference car image which correspond to the object's blob with the corresponding pixels in the current car image. This eliminates the noise object from future frames. The following figures will step through the entire process.

Figure 18D:
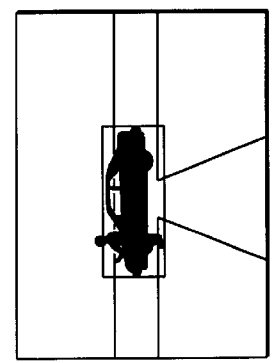
FIGS. 18A to 18D illustrates an example of a person exiting and occluding a car.
Figure 18C:
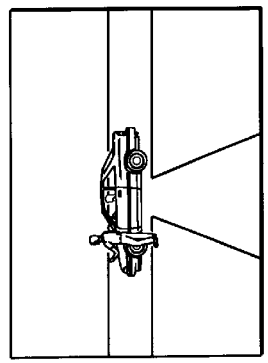
Figure 18B:
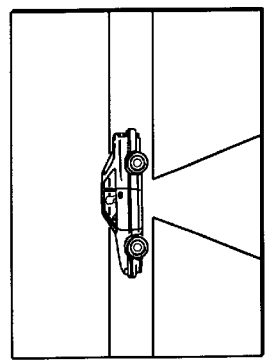
Figure 18A:
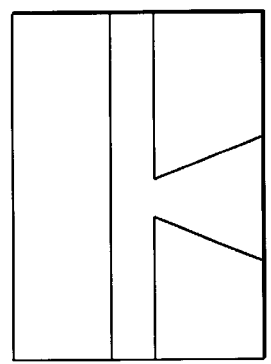

FIGS. 18A to 18D illustrates an example of a person exiting a car. FIG. 18A illustrates the background image. FIG. 18B illustrates the updated reference image which includes the car. FIG. 18C illustrates the current video image including the person walking by the front of the car. FIG. 18D illustrates the final output image. This final output image includes an object which appears over the window of the car. Closing the car door causes this noise object to appear over the window area of the car door.

Figure 19A:
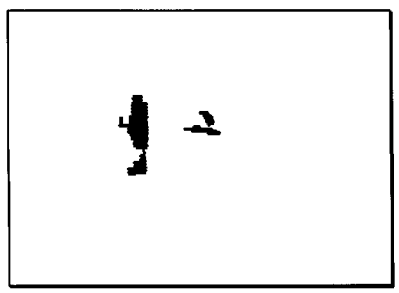
FIGS. 19A to 19F illustrate the false object correction process.
Figure 19C:
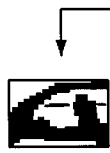
Figure 19B:
Figure 19D:
Figure 19E:
Figure 19F:
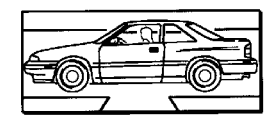

FIGS. 19A to 19F illustrate the object correction process. FIG. 19A illustrated the foreground difference image corresponding to the current video image of FIG. 18C. FIG. 19B illustrates an object blob from foreground difference image caused by noise. FIG. 19C illustrates an edge image of the window portion of the car. The system compares the object's blob's pixels illustrated in FIG. 19B to the edge pixels illustrated in FIG. 19C. The system then determines that over 70% of the pixels match. FIG. 19D illustrates the current reference car image. FIG. 19E illustrated the current car image. FIG. 19F illustrates the resulting corrected reference car image in which the reference car image pixels of corresponding to the noise blob are replaced with the corresponding current image pixels.

Another source of false objects arises from reference car images which contain non-occluding moving objects in them. These bad reference car images occur because of over-aggressive grouping of blobs to form objects. Hence, non-car objects get merged with car objects and the resulting object is labeled as a car. When this car comes to rest, its image updates the reference image producing an incorrect updated reference image. The result is that when the non-car object moves to a different location, a false object appears in its old location because it is in the updated reference image.

To correct for this problem, any time an object appears in the scene, the system validates it by doing the following. The pixels of the object's blob in the foreground difference image is compared to the corresponding pixels in the car difference image. If less than 50% of the pixels match, then the object is most likely a false object. This method works because the car difference image will only contain blobs for objects that are objects in the current frame since it is differencing with the background car image. Therefore, if the foreground difference image has a blob that does not correspond to a blob in the car difference image, then that blob necessarily represents a false object. FIGS. 20, 21 and 22 step through an example of this process.

Figure 20A:
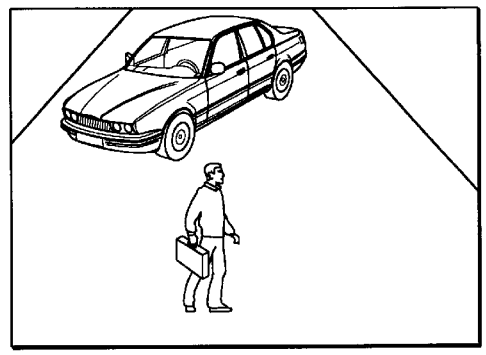
FIGS. 20A and 20B illustrate an updated reference image including a car and improperly including a person and the corresponding current video image, respectively.
Figure 20B:
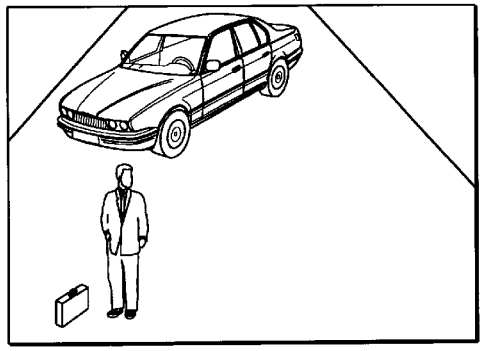

FIG. 20A illustrates an updated reference image including a car and improperly including a person. FIG. 20B illustrates a corresponding current video image. In FIG. 20A, the person walking by the car was incorrectly grouped with the car when the car came to a rest. Therefore, the whole region containing the person and the car were merged into the updated reference image shown in FIG. 20A. In the current video image of FIG. 20B, the person continues walking. This will cause a false object to appear.

Figure 21A:
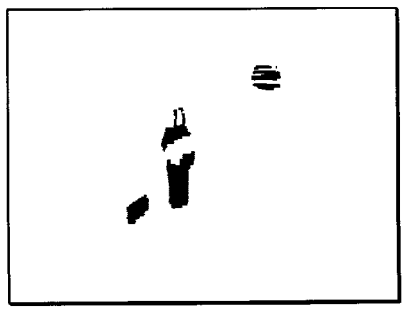
FIGS. 21A to 21D illustrates the result of this improper inclusion of the person in the car image.
Figure 21D:
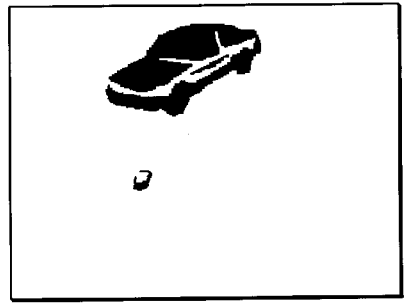
Figure 21B:
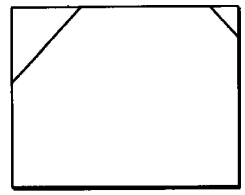
Figure 21C:
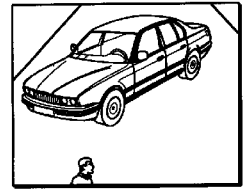

FIGS. 21A to 21D illustrates the result of this improper inclusion of the person in the car image. FIG. 21A illustrates the foreground difference image. This foreground difference image of FIG. 21A contains blobs representing objects that appear because of a difference between the current video frame and the improper updated reference image shown in FIG. 20A. FIG. 21B illustrates the car background image. FIG. 21C illustrates the current car image. FIG. 21D illustrates the resulting car difference image. One can see in this car difference image that the top half of the person blob in the foreground difference image of FIG. 21A does not exist in the car difference image of FIG. 21B.

FIGS. 22A to 22E illustrates the process of correcting the reference car image. FIG. 22A illustrates an object blob from foreground difference image corresponding to the top half of the person. FIG. 22B illustrates the corresponding object blob from car difference image. Less than 50% of the pixels of the object's blob in the foreground difference image of FIG. 22A matches the corresponding blob in the car difference image of FIG. 22B. Therefore, the pixels in the reference car image illustrated in FIG. 22C which correspond to the pixels of FIG. 22A are replaced by the corresponding pixels in the current car image of FIG. 22D. This process results in the corrected reference car image shown in FIG. 22E. As shown in FIG. 22E, this may not result in complete correction of the reference car image. However, the presence of remaining false objects in the reference car image will result in another correction taking place for the next video image as described above. This correction process will completely correct the reference car image within a few video images.

False objects can arise from not only non-occluding objects being included in the reference car image, but they can also arise from occluding objects that are accidentally included as part of the reference car image. Bad reference car images are taken when the system updates the reference image with a car image that has a moving object occluding the car. This error generates false objects because when the occluding object moves away, false objects appear due to the object being in the updated reference image.

To correct for this problem, any time an object appears in the scene, the system validates it by doing the following. The system generates a binary edge image for both the reference car image and the current car image using the Sobel edge detection technique. Then, the edge pixels of the object's blob in the foreground difference image are compared with the edges in both edge images. If more pixels match the reference car edge image than the current car edge image, then the object is considered false and is discarded. Finally, the reference car image is corrected in a manner similar to that of non-occluding moving objects. FIGS. 23 and 24 illustrate this process.

FIGS. 23A to 23D show an instance where the system recognizes that the car is resting late. Hence, the car door is in the process of being opened when the car image is merged to create the updated reference. FIG. 23A illustrates the background image. FIG. 23B illustrates the updated reference image including the incorrect open door image. FIG. 23C illustrates the current video image. The person has now completely exited the car and closed the door. FIG. 23D illustrates the resulting final output image. FIG. 23D illustrates an object which appears over the door of the car due to the open door in the updated reference image shown in FIG. 23B.

Figure 24A:
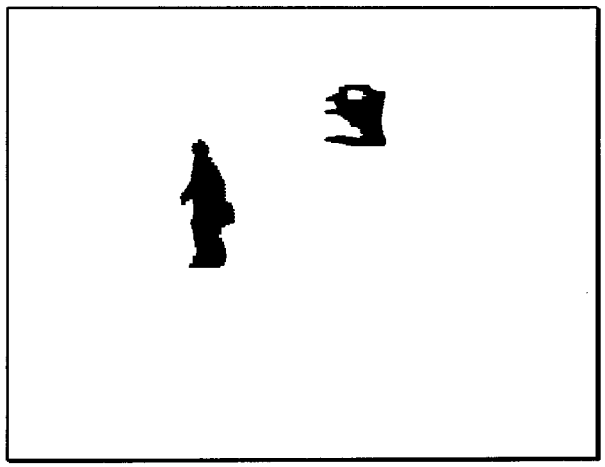
FIGS. 24A to 24G illustrate how this improper updated reference image is corrected.
Figure 24B:
Figure 24C:
Figure 24E:
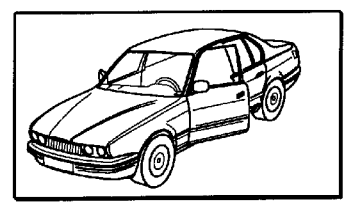
Figure 24D:
Figure 24F:
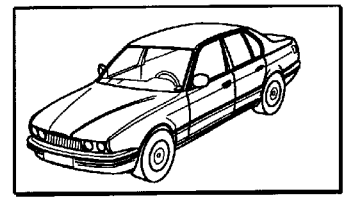
Figure 24G:
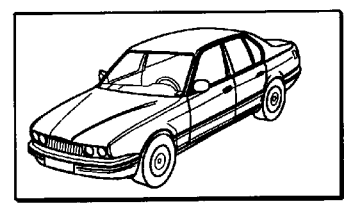

FIGS. 24A to 24G illustrate how this improper updated reference image is corrected. FIG. 24A illustrates the foreground difference image. FIG. 24B illustrates an object blob from foreground difference image. FIG. 24C illustrates the edge image from reference car image with the object blob of FIG. 24B overlain in light gray. FIG. 24D illustrates the edge image from current car image with the object blob of FIG. 24B overlain in light gray. FIG. 24E illustrates the uncorrected reference car image. FIG. 24F illustrates the current car image. The edge images in FIGS. 24C and 24D have the object's blob overlaid on top of them in light gray. Black pixels represent pixels that are only in the edge image. Dark gray pixels represent pixels that are both in the edge image and in the object's blob. As one can see, more of the edges of the blob coincide with the reference edge image illustrated in FIG. 24C than with the current edge image illustrated in FIG. 24D. Therefore, the pixels which correspond to the object's blob in the reference car image of FIG. 24E are replaced with the corresponding pixels in the current car image of FIG. 24F. This creates the corrected reference car image illustrated in FIG. 24G.

We wish to protect two aspects of the invention. The first is the system concept: a configuration of hardware and software that analyzes video images to detect interactions of people and vehicles, specifically including entry, exit, and opening or closing of doors or trunk, and then takes action in response. Actions include notifying a human, logging the event, saving a photograph or video clip of the event, or other obvious extensions.

The second aspect of the invention that we wish to protect is the specific technique used to track people and vehicles during interactions. Pixels in the incoming frame that are very different from the reference frame are grouped into sets corresponding to objects. This technique works well for isolated objects, but fails when two objects (e.g. a human and a car) appear to overlap in the image. In this case the earlier technique regards the human and car as a single, non-rigid object. In the new art, software identifies cars as vehicles and tracks them as they move. When the car comes to rest, its image is temporarily inserted into the reference image. This allows the system to track people when they move in front of or behind the car, and to detect changes in the car shape due to doors opening, etc. When the car begins to move again, the system restores the reference image to its original state and tracks the car using the older tracking method.

What is claimed is:

1. A method for detecting interactions between people and vehicles from a video stream of a sequence of images of a scene comprising the steps of:

forming a reference image consisting of a background of the scene;

forming an updated reference image including any stationary car objects including forming a background difference image between a current image and said reference image, detecting objects in said difference image, determining if any detected object in said difference image is a car object, determining whether any car objects are stationary, upon initial determination that a detected car object becomes stationary forming a reference car image of a portion of said current image corresponding to a position of any stationary car object, and substituting said reference car image for a corresponding portion of said reference image, thereby forming said updated reference image;

forming a foreground difference image between a current image and said updated reference image; and detecting any blobs in said foreground difference image thereby detecting objects other than any stationary car objects in the scene.

2. The method of claim 1, wherein:

said step of determining whether any detected object in said difference image is a car object includes determining a detected object is a car object if said detected object has a height greater than 3.5 feet and a width of greater than 11.0 feet.

3. The method of claim 1, wherein:

said step of determining whether any detected object in said difference image is a car object includes determining a detected object is a car object if said detected object has greater than a minimum size and a height/width aspect ratio of less than a predetermined aspect ratio.

4. The method of claim 3, wherein:

said minimum size includes a height greater than 3.5 feet and a width of greater than 11.0 feet; and said predetermined aspect ratio 1 s 0.7.

5. The method of claim 1, further comprising:

tracking a position of each detected object in an immediately prior image to a corresponding detected object of a current image; and if an object of said immediately prior image overlaps a car object of said immediately prior image for a first image when said car object is determined to be stationary, then said step of forming an updated reference image includes forming a fake background in said updated reference image having black pixels at all pixel locations of said overlapping object in said immediately prior image.

6. The method of claim 5, further comprising:

determining if a stationary car object in an immediately prior image begins to move in a current image;

upon determination that a car object begins to move in said current image, checking for validity any detected object by determining if any pixels of each detected object includes black pixels corresponding to said fake background, and declaring said detected object as false and not tracking any object in an immediately prior image to said detected object of a current image if said determined number of black pixels corresponding to fake background is greater than 70% of all pixels of said detected object.

7. The method of claim 1, further comprising the steps of:

determining whether a previously stationary car object begins to move by comparing a stationary car object in a prior image with a corresponding car object in a current image, calculating a prior centroid of said previously stationary car object in the prior image, calculating a current centroid of said corresponding car object in the current image, and determining said previously stationary car object has begun to move if said prior centroid and said current centroid differ by more than a predetermined amount.

8. The method of claim 7, wherein:

said predetermined amount is 6.5 pixels.

9. The method of claim 1, further comprising the steps of:

upon detection of a stationary car object forming a car background image of a portion of said reference image corresponding to the position of said reference car image;

determining whether a previously stationary car object begins to move;

upon determining that a previously stationary car object has begun to move removing detected objects overlapping the now moving car object, and substituting said reference car image for a corresponding portion of said updated reference image, thereby restoring said reference image.

10. The method of claim 1, further comprising the steps of:

determining whether a previously stationary car object begins to move;

upon determining that a previously stationary car object has begun to move determining if any detected object corresponds to an object overlapping a car object in an immediately prior image, and checking for validity any such detected overlapping object.

11. The method of claim 10, further comprising:

tracking a position of each detected object in an immediately prior image to a corresponding detected object of a current image; and said step of checking for validity includes determining whether a track of objects in prior images corresponding to any detected overlapping object is less than a predetermined number of images, declaring said detected overlapping object as false and not tracking any object in an immediately prior image to said detected overlapping object of a current image if said track of corresponding objects in prior images is less than said predetermined number of images.

12. The method of claim 11, further comprising:

if said track of objects in prior images corresponding to any detected overlapping object is greater than or equal to said predetermined number of images reviewing corresponding objects along said track of said object back track until a prior object is found having a width of less than 3 feet which is not changing substantially between images, storing said prior object, when said car object moves whereby said detected overlapping object no longer overlaps said car object comparing said prior object to said corresponding object in said current image, and confirming tracking of said prior object to said object in said current image if said prior object substantially matches said object in said current image.

13. A method for detecting interactions between people and vehicles from a video stream of a sequence of images of a scene comprising the steps of:

forming a reference image consisting of a background of the scene;

forming a background difference image between a current image and said reference image;

detecting objects in said background difference image;

determining if any detected object in said background difference image is a car object;

determining whether any car objects are stationary;

forming an updated reference image including any stationary car objects;

forming a foreground difference image between a current image and said updated reference image;

detecting any blobs in said foreground difference image thereby detecting objects other than any stationary car objects in the scene; and checking for validity any objects newly detected in said current image by determining a number of pixels of any newly detected object in said foreground difference image matching corresponding pixels in said car difference image, and declaring said newly detected object as false and not tracking any object in an immediately prior image to said newly detected object of a current image if said determined number of matching pixels is less than half of all pixels of said detected newly moving overlapping object.

14. A method for detecting interactions between people and vehicles from a video stream of a sequence of images of a scene comprising the steps of:

forming a reference image consisting of a background of the scene;

forming a background difference image between a current image and said reference image;

detecting objects in said background difference image;

determining if any detected object in said background difference image is a car object;

determining whether any car objects are stationary;

forming an updated reference image including any stationary car objects;

forming a foreground difference image between a current image and said updated reference image;

detecting any blobs in said foreground difference image thereby detecting objects other than any stationary car objects in the scene; and determining an ENTER CAR event whenever any detected object overlaps a position of any stationary cars in one image in the video stream and a corresponding detected object is not present in a next following image in the video stream.

15. A method for detecting interactions between people and vehicles from a video stream of a sequence of images of a scene comprising the steps of:

forming a reference image consisting of a background of the scene;

forming a background difference image between a current image and said reference image;

detecting objects in said background difference image;

determining if any detected object in said background difference image is a car object;

determining whether any car objects are stationary;

forming an updated reference image including any stationary car objects;

forming a foreground difference image between a current image and said updated reference image;

detecting any blobs in said foreground difference image thereby detecting objects other than any stationary car objects in the scene; and determining an EXIT CAR event whenever a detected object overlaps a position of any stationary car in one image in the video stream and a corresponding detected object is not present in an immediately prior image in the video stream.

\* \* \* \* \*